(12) United States Patent
Janz et al.

(10) Patent No.: US 7,661,328 B2
(45) Date of Patent: Feb. 16, 2010

(54) PROBE HOLDER SYSTEM, METHOD FOR FIXING A PROBE HOLDER SYSTEM AND METHOD FOR ADJUSTING A PROBE

(75) Inventors: Fredi Janz, Moers (DE); Vinko Mikulec, Duisburg (DE)

(73) Assignee: Siemens Aktiengesellschaft, Munich (DE)

( * ) Notice: Subject to any disclaimer, the term of this patent is extended or adjusted under 35 U.S.C. 154(b) by 285 days.

(21) Appl. No.: 11/794,289

(22) PCT Filed: Oct. 13, 2005

(86) PCT No.: PCT/EP2005/055222

§ 371 (c)(1),
(2), (4) Date: Jun. 26, 2007

(87) PCT Pub. No.: WO2006/069824

PCT Pub. Date: Jul. 6, 2006

(65) Prior Publication Data

US 2008/0271548 A1   Nov. 6, 2008

(30) Foreign Application Priority Data

Dec. 27, 2004   (EP) ................................ 04030822

(51) Int. Cl.
*G01D 21/00* (2006.01)
(52) U.S. Cl. .................................................. 73/866.5
(58) Field of Classification Search ................. 73/866.5
See application file for complete search history.

(56) References Cited

U.S. PATENT DOCUMENTS 6,490,939 B1 * 12/2002 Sargent ...................... 73/866.5
6,575,048 B1 * 6/2003 Tow .......................... 73/866.5

FOREIGN PATENT DOCUMENTS

EP        1 471 341 A1   10/2004

* cited by examiner

*Primary Examiner*—Hezron Williams
*Assistant Examiner*—Nathaniel Kolb

(57) ABSTRACT

A probe holder system for fixing a probe to a housing wall, wherein it is possible to provide a simple structure and position the probe as accurately and easily as possible in relation to a measuring object. According to the invention, a housing bushing provided with an inner thread and a carrier rod for the probe, which can be screwed into the threaded bushing, are provided. The threaded bushing can be placed in a reference position in an associated recess of the housing wall and can be arrested by means of a locking element.

12 Claims, 1 Drawing Sheet

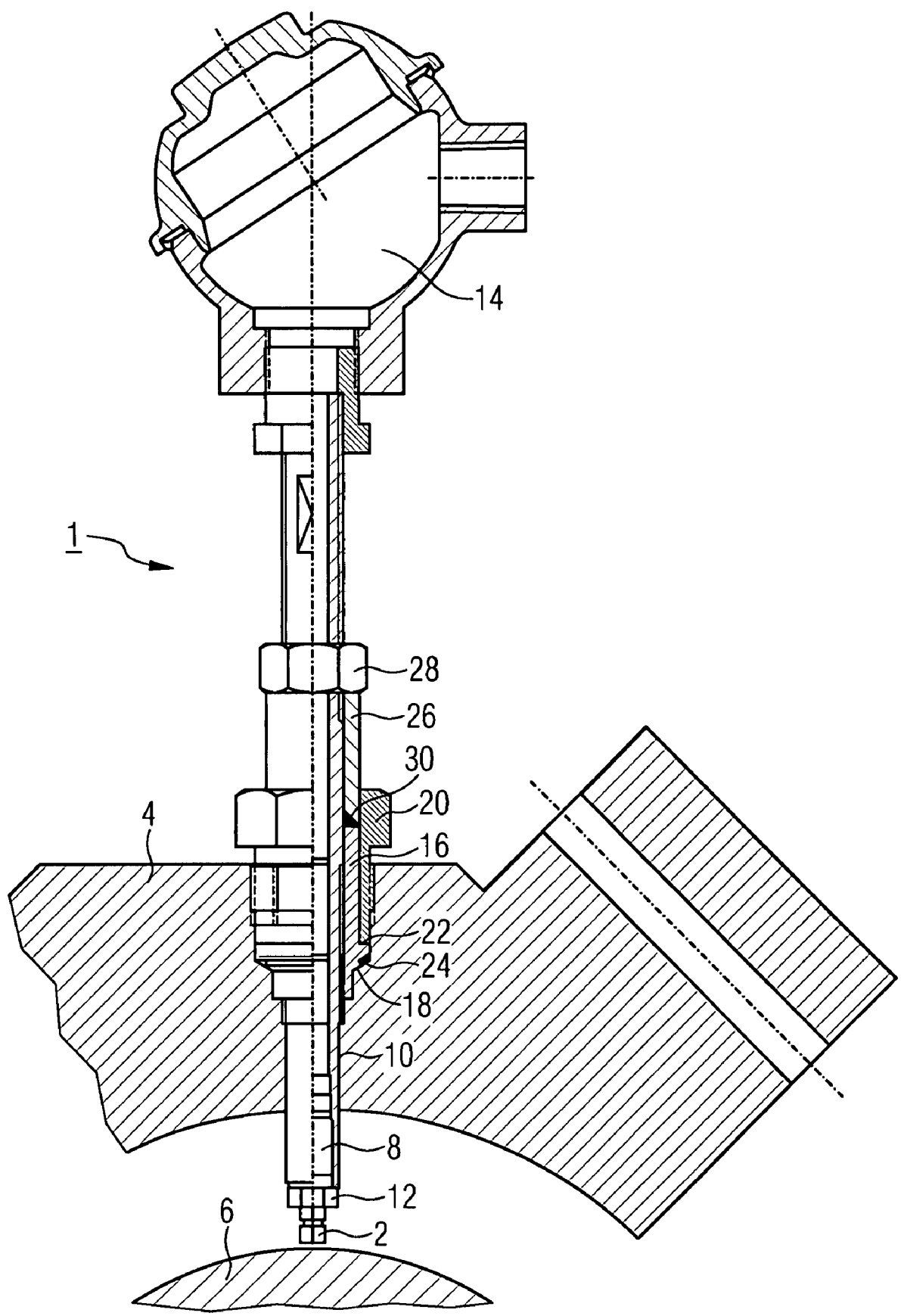

PROBE HOLDER SYSTEM, METHOD FOR FIXING A PROBE HOLDER SYSTEM AND METHOD FOR ADJUSTING A PROBE

CROSS REFERENCE TO RELATED APPLICATIONS

This application is the US National Stage of International Application No. PCT/EP2005/055222, filed Oct. 13, 2005 and claims the benefit thereof. The International Application claims the benefits of European application No. 04030822.3 filed Dec. 27, 2004, both of the applications are incorporated by reference herein in their entirety.

FIELD OF INVENTION

The invention relates to a probe holder system for fastening a probe to a housing wall. The invention also relates to a method for fastening a probe holder system of said type to a housing wall, and to a method for adjusting a probe which is fastened to a probe holder system of said type.

BACKGROUND OF THE INVENTION

In transmissions, engines, single-shaft and gearing compressors, probes can be used for shaft monitoring. Here, a shaft oscillation measurement, a rotational speed measurement or a shaft level measurement is for example carried out. In a broader sense, a probe of said type usually comprises a probe head which is arranged on a probe support and has a measuring sensor for the actual measurement of the measurement values. Said measuring sensor itself is often also referred to in a narrower sense as a probe; The probe support often has a bar-shaped or tube-shaped design, so that it can, even under comparatively restricted spatial conditions, be guided relatively easily through an access opening of a housing which surrounds the shaft to be monitored and can be extracted again from said access opening if required, in particular for servicing purposes. The probe head or the measuring sensor can therefore be placed into its operating position at a point of the housing interior space which is comparatively difficult to access without it being necessary for the housing to be dismantled, or for parts of said housing to be removed, for this purpose.

In order to carry out the measurement as precisely as possible, in particular in order to avoid systematic measurement errors, the measuring sensor must generally be positioned very close to the shaft with a high degree of precision. The permissible tolerance to the nominal distance in the radial or axial direction is often only a fraction of a millimeter. A fastening device for the probe or for the probe support is therefore required which can be precisely adjusted and reliably connected to the housing. A device of said type is generally mounted from the outside after the assembly of the housing or of the machine. Under some circumstances, a retroactive adaptation of the probe position to changed operating conditions of the machine is necessary.

In the case of known probe holders, a screw-in connecting piece is usually screwed with an outer thread into a bore, of the shaft housing, and is fixedly secured on the housing by means of a tube nut. Here, a thread seal can be provided between the tube nut and the housing. The actual measuring probe or measuring sensor is generally arranged here on a support bar which, for assembly, is inserted into the screw-in connecting piece and fixed to the latter by means of a sleeve nut in such a way that the nominal distance of the measuring sensor to the shaft or to the respective object to be measured is approximately reached. Fine adjustment of the arrangement can then be carried out when the tube nut is loosened by rotating the screw-in connecting piece in the threaded bore of the housing wall.

A fundamental problem of the described arrangement is however that the fine adjustment must be carried out again every time the probe has been removed from and re-inserted into the housing for servicing or cleaning purposes or the like. In addition, the adjustment itself is comparatively complex and difficult since, when tightening the tube nut, the screw-in connecting piece itself rotates again out of the previously painstakingly determined nominal position. In the case of machines with a plurality of measuring probes of said type, the time loss associated with the re-adjustment can be considerable. In a machine with 20 measuring probes, said time loss can, for example, be up to a day.

A further disadvantage of said arrangement is that, in the case of a shaft which is mounted in an oil bath, the support bar and the screw-in connecting piece must be produced with high dimensional accuracy with a clearance fit to one another in order to obtain a high impermeability to oil, which is relatively expensive. Sealing problems have however already occurred in the case of this implementation of a probe holder. A further disadvantage of the arrangement is that its range of adjustment is limited by the length of the screw-in connecting piece, so that a plurality of holders can be necessary for using the probe at different measuring points.

SUMMARY OF THE INVENTION

The invention is therefore based on the object of specifying a probe holder system for fastening a probe to a housing wall which, while having a design which is kept simple, allows the probe to be positioned as simply and precisely as possible. A method for fastening a probe holder system of said type to a housing wall and a method for adjusting a probe which is arranged on a probe holder system of said type should also be specified.

With regard to the probe holder system, said object is achieved by means of a threaded sleeve which has an internal thread and having a support bar, which can be screwed into the threaded sleeve, for the probe, with it being possible for the threaded sleeve to be placed into a reference position in a recess of the housing wall and to be locked into said reference position by means of a fixing element, with the probe holder system being formed with a detachable anti-twist device for the support bar, in the case of which a counternut which can be screwed onto the support bar is provided as a constituent part of the anti-twist device, with a spacer sleeve which is arranged so as to be moveable on the support bar being provided between the counternut and the threaded sleeve.

Here, the invention proceeds from the consideration that, in order to reduce the servicing expenditure, only a one-off adjustment and alignment of the probe during the initial assembly of the probe holder system should be necessary. If the probe or the entire probe holder is removed from the housing to which it is attached for servicing purposes and is subsequently re-inserted, its original, that is to say the already-calibrated position, should be particularly easy to reproduce. A time-consuming re-adjustment should be eliminated. Furthermore, an inadvertent displacement or twisting of the probe out of a once-attained reference position should be prevented when initially still loosened fastening means are tightened or locked during the initial assembly or during a repeated assembly of the probe holder. In order to prevent the fastening process and the adjustment process or fine adjustment from mutually influencing one another in a troublesome manner, the basic functions of the probe holder system, specifically "fastening" (or "locking") and "adjustment" (or "calibration") should therefore be decoupled from one another on account of the construction or design.

For this purpose, the support bar for the probe is screwed into a threaded sleeve, so that the position of the probe head with the measuring sensor, which is arranged on the end side of the support bar, can be adjusted by rotating the support bar relative to the threaded sleeve. When the probe holder system is mounted on the housing, the threaded sleeve is locked in a reference position in a recess, which is assigned to the respective measuring position, of the housing wall by means of a fixing element which acts on said threaded sleeve. The fixing element is therefore connected to the support bar not directly but rather only indirectly by means of the threaded sleeve. A decoupling of the fastening function from the adjustment function is obtained in this way. Forces or torques occurring during the locking process are merely absorbed by the threaded sleeve and not transmitted on to the support bar, so that a once-reached fine adjustment of the support bar in the threaded sleeve cannot inadvertently be disrupted again by the action of the fixing element. By virtue of the fact that the threaded sleeve and the support bar form a unit which can be removed as such from the recess of the housing wall in a reversible manner (for example for servicing purposes), an automatic and precise reproducibility of the original spacing of the measuring sensor, which is attached to the support bar, to the object to be measured is ensured during the subsequent re-insertion.

The reference position of the threaded sleeve when the probe holder system is mounted is advantageously defined by means of a stop face, which is provided in the recess of the housing wall, for the threaded sleeve.

A stop of said type, which limits the maximum insertion depth for the threaded sleeve, can for example be formed by means of an encircling web or ring which is inserted into and fixedly connected to the recess of the housing wall. The stop face is however advantageously integrated directly into the contour of the recess. For this purpose, the recess has a transition point with a narrowing internal cross section, with the section or the partial duct with the smaller internal cross section facing the housing interior, and a leadthrough of the support bar, with the probe or measuring sensor arranged on the head side, being permitted. The internal cross section, which is larger in comparison thereto, of that partial section of the recess or of the outer partial duct which is oriented toward the outer side of the housing is matched to the external cross section of the threaded sleeve which can be inserted up to the stop position defined by the narrowing section of the recess. Here, "inner side" means that side which faces toward the shaft to be monitored or the object which is to be measured, and "outer side" means that side of the housing wall which faces away therefrom, with the assembly and the adjustment of the probe holder taking place from the outside. It is however not absolutely imperative for the housing overall to surround a completely closed-off interior space. The housing or casing of the machine can in fact also be open to the environment at another point.

In one particularly advantageous embodiment, the narrowing section of the recess has a funnel-shaped design, with the outer contour of the threaded sleeve, in particular at its end side which is aligned toward the narrowing section of the recess, advantageously being matched to the shape of the recess. The contours, which are coordinated with one another, of the narrowing section and of the end face of the threaded sleeve permit a self-centering insertion of the threaded sleeve into its reference position in the recess. The largely planar contact, with a suitable clearance fit, against the stop face and against the side wall of the recess promotes tilt-free seating of the threaded sleeve, with any contact forces which act being distributed uniformly over the periphery of the contact face. If appropriate, the support bar is also produced so as to assist a fixed central seat with a clearance fit to the inwardly directed partial section of the recess in the housing wall. The conically narrowing stop face of the recess is produced in a simple way for example using a correspondingly shaped standard drill bit.

The stop face of the housing wall or that end side of the threaded sleeve which is aligned toward the stop face preferably has an encircling cutout for holding a sealing ring, in which a sealing ring is advantageously positioned. It is possible in this way to obtain a reliable, in particular oil-tight seal of the threaded sleeve with respect to the recess or bore in the housing wall. The cutout for holding the sealing ring is usually arranged in the threaded sleeve, since it can be produced there relatively easily, and a sealing ring which is positioned at this point can be easily exchanged when the probe holder is dismounted. The elastic sealing ring, which projects beyond the (with respect to the central axis of the threaded sleeve) inner and outer encircling edges of the cutout without the influence of external forces, is expediently dimensioned such that, when the fixing element is tightened, said elastic sealing ring is pressed completely into the cutout, that is to say ends flush with said two edges. In this way, the calibration function of the stop face in the region outside the cutout is maintained. It is thereby possible in particular for the threaded sleeve to assume a reference position, which is precisely reproducible every time, precisely and regardless of the degree of deformation or squashing of the sealing ring.

In order to provide secure locking of the threaded sleeve in its reference position, a fixing element is provided which can be designed in the form of a clamping or latching lock. In one preferred embodiment, however, the probe holder system has a screw-in connecting piece which can be screwed into the housing wall from the outside. Here, the internally-hollow shank, which surrounds the support bar, of the screw-in connecting piece is provided with an external thread which corresponds to an internal thread in the recess, which is provided for receiving the screw-in connecting piece, in the housing wall. In the fully-assembled state of the probe holder system, the end face which is aligned toward the threaded sleeve, or the encircling edge face, of the screwed in and tightened screw-in connecting piece comes into contact with a contact face, which faces it, of the threaded sleeve, and if appropriate exerts pressure on said contact face, thereby fixing the threaded sleeve in its reference position in the housing wall. With a correspondingly shaped outer contour of the threaded sleeve, that is to say if the contact face for the screw-in connecting piece forms a projection, then the shank, which is smooth on the inside, of the screw-in connecting piece in the locked position can at least partially enclose the threaded sleeve, with the outer side of the threaded sleeve and the inner side of the shank preferably being designed with a clearance fit with respect to one another. That is to say, in the section in question, the support bar is additionally supported and centered against the housing wall by means of the threaded sleeve and the shank, which encases the threaded sleeve, of the screw-in connecting piece.

An inadvertent twisting of the support bar and an associated disadjustment of the probe can be avoided by means of a thread which is designed to be sufficiently difficult to turn. In order to prevent an inadvertent displacement, for example as a result of vibrations or the like, in the case also of a thread which is designed for a simple adjustment of the support bar with an agreeable force expenditure, the probe holder system is preferably provided with an anti-twist device, which can be detached on demand, for the support bar.

The counternut can be arranged so as to act directly on that end of the threaded sleeve which is aligned toward the exterior of the housing. The spacer sleeve which is arranged on the support bar so as to be moveable between the counternut and the threaded sleeve is advantageous with regard to simple accessibility of the counternut if the threaded sleeve, in its reference position, is sunk completely in the recess of the housing wall and/or if a screw-in connecting piece of the described type is provided as a fixing element for the threaded sleeve. With the support bar prevented from twisting, the spacer sleeve rests on the threaded sleeve and is braced against the threaded sleeve by means of the tightened counternut. The counternut can be operated independently of the fixing element, which can be designed in particular in the manner described above as a screw-in connecting piece, so that a once-set adjustment of the support bar in the threaded sleeve, which is fixed by means of the counternut, can be maintained even in the case of a temporary dismounting or removal of the probe holder from the housing wall.

The encircling edge, which is oriented toward the support bar and toward the threaded sleeve, on that end of the spacer sleeve which is aligned toward the threaded sleeve preferably has an encircling cutout for holding a sealing ring, in which a sealing ring is advantageously positioned. In this way, the spacer sleeve is sealed off both with respect to the support bar and also (when the counternut is tightened) with respect to the threaded sleeve. In combination with the sealing ring which is provided on the outside of the threaded sleeve, all leakage possibilities for oil or other liquids which surround the measurement point are reliably sealed off in a simple and cost-effective manner.

For the case that a screw-in connecting piece of the specified type is provided as a fixing element for the threaded sleeve, the shape and dimensions of the screw-in connecting piece and of the spacer sleeve are preferably selected such that the spacer sleeve, in the mounted state of the probe holder system, engages at least partially into a cavity which is delimited by the support bar and the inner side of the screw-in connecting piece, with the spacer sleeve being produced in particular with a clearance fit with respect to the support bar and the screw-in connecting piece. Such a construction increases the mechanical stability of the entire arrangement and effectively prevents tilting of the support bar out of its central position.

In order to ensure that the screw-in connecting piece can be screwed completely out of the housing even when the anti-twist device is locked, that is to say when the counternut is tightened, the free internal cross section of the screw-in connecting piece is preferably at least as large as the outer cross section of the counternut. In other words: the counternut has no troublesome projection, so that the screw-in connecting piece can be pushed or turned over the latter. In a preferred alternative embodiment, in which the outer cross section of the counternut can also be larger than the free internal cross section of the screw-in connecting piece, when the anti-twist device is locked and the screw-in connecting piece is tightened, that part of the spacer sleeve which projects beyond the head of the screw-in connecting piece is at least as long as the shank of the screw-in connecting piece which is sunk into the housing wall. In this configuration, too, the screw-in connecting piece can be detached completely and easily from the housing wall.

A probe, in particular a probe for shaft monitoring, is preferably arranged on that end of the support bar which is aligned toward the housing interior. Cables or lines which are attached to the probe can be integrated into the support bar and can be guided outward in this way. A connecting head for the external connection or the cabling of the probe can be provided at the opposite end of the support bar from the probe or the measuring sensor.

The recess which is provided for holding the probe holder, that is to say in particular for holding the threaded sleeve, can also be arranged in an adapter component which itself is inserted into a recess, which is assigned to it, of the housing wall. Here, the adapter part is preferably fixedly and permanently connected to the housing wall and can therefore be understood to be a constituent part of said housing wall. The use of an adapter of said type has proven to be expedient in particular in the case of relatively small housing wall thicknesses. The use of adapter pieces can also be necessary in the case of old machines with already existing recesses or bore holes which were however not originally designed, with regard to their respective dimensions, for a probe holder system now provided for retrofitting.

With regard to the method for adjusting a probe, the object is achieved in that the support bar for the probe is rotated relative to the threaded sleeve into which it is screwed in, thereby varying the position of the probe relative to the threaded sleeve. Said adjustment or calibration is preferably carried out when the probe holder system is already fastened to the housing wall, wherein the fixing element for the threaded sleeve is situated in the locked position. In this way, the probe can be aligned relative to the object to be measured in situ with a high degree of precision. Here, the fixing element, by means of the pressure which it exerts on the threaded sleeve, prevents an undesired turning away or concomitant turning of said threaded sleeve. Guide pins or webs or the like for fixedly holding the threaded sleeve during the adjustment process are therefore not necessary.

In order to fasten the probe holder system, the threaded sleeve with the screwed-in and if appropriate already adjusted and rotationally secured support bar is inserted into the corresponding recess and subsequently locked by means of the fixing element. Disassembly takes place correspondingly in the reverse sequence.

The advantages obtained by means of the invention are in particular that, on account of the deliberate decoupling of functional units which serve for fastening and for adjustment, the probe holder system can be attached to a housing particularly easily and quickly and, here, permits particularly precise positioning of a probe. While production is kept comparatively simple and handling is made easier overall, a one-off adjustment of the probe, in particular during initial assembly, is maintained even in the event of a temporary disassembly of the holder, for example for servicing purposes, so that during the re-installation, the original spacing of the probe to the object to be measured is reproduced automatically and particularly precisely. A re-adjustment of the probe holder system can therefore be dispensed with, thereby considerably shortening assembly times.

If required, the probe together with its holder can also be used at another measurement point of the respective machine or else on another machine, with a re-adjustment generally being necessary. For precise adjustability of the probe, it is sufficient to provide the threaded sleeve and the support bar with a fine thread, wherein the production tolerances and the clearance fits of the remaining components can by all means be kept relatively generous. It is possible in particular for the recess, provided in each case in the housing wall, for holding the threaded sleeve to be produced comparatively simply and with comparatively low precision requirements with a standard drill bit. The arrangement of the annular seals additionally provides highly effective and cost-effective sealing of the system even if high pressure prevails within the machine.

The comparatively large range of adjustment of the probe holder permits the use of one and the same type at several different measurement points with varying distance to the surrounding housing. The number of variants can therefore be kept low for a specified probe holder system even in the case of different applications. Here, the adjusting mechanism operates extremely finely and precisely. In addition, the probe holder system can be of comparatively compact overall design, thereby making it possible to avoid component collisions with adjacent components, for example where there is little installation space, and enlarging the range of application of the probe holder system.

In addition to shaft monitoring, the probe holder system can also be used in other fields in which a measuring sensor should be arranged at a nominal distance from a measurement point within a housing or a container or on a frame, wherein the distance to be bridged between the respective measuring sensor and the housing wall which serves for fastening or the frame can be different from measurement point to measurement point or from machine to machine. An example of such a range of application is the measurement of body parts in the automotive industry, in which measuring sensors are used for quality control.

BRIEF DESCRIPTION OF THE DRAWINGS

One exemplary embodiment of the invention is explained in more detail on the basis of a drawing, in which the FIGURE shows a half-section through a probe holder system which is fastened to a housing.

DETAILED DESCRIPTION OF INVENTION

The probe holder system 1 as per the FIGURE is provided for fastening a probe 2 to a housing 4 of a machine (not illustrated in any more detail). Here, the probe 2 is used for the rotational speed measurement of a shaft 6 which is surrounded by the housing 4, wherein the shaft 6 is mounted in oil in order to reduce friction and for cooling. Here, the oil pressure prevailing in the interior of the housing 4 exceeds the ambient pressure outside the machine or the housing 4. For the highest possible measurement accuracy in the rotational speed measurement, the probe 2 is positioned at a comparatively small radial distance to the shaft 6 of 1.5 mm, wherein the permissible tolerance is only.+−.0.1 mm.

The actual probe 2 or the measuring sensor is arranged on the head side of a support bar 8 which is inserted from the outside into a corresponding recess 10 of the housing wall, and can also be extracted from there again for servicing purposes. A connecting head 14 is provided on the support bar 8 opposite the probe head 12, via which connecting head 14 the external cabling of the probe 2 can take place.

The probe holder system 1, while having a simple design, is designed in particular such that, on the one hand, the probe 2 or the probe head 12 can be mounted particularly precisely with respect to the distance from the shaft 6, and on the other hand, a re-adjustment of the arrangement can be avoided in the event of a disassembly and re-assembly. The probe holder system 1 is thus designed such that the original distance between the probe head 12 and the shaft 6 can be reproduced as simply and precisely as possible in the event of a re-assembly.

For this purpose, the probe holder system 1 is provided with a threaded sleeve 16, which has an internal thread, for holding the support bar 8, which threaded sleeve 16 is inserted up to a precisely defined reference position into a corresponding recess 10 of the housing wall. Here, the outer contour of the threaded sleeve 16 is matched, at its end side which is aligned toward the housing interior or toward the probe 2, to the shape of the recess 10 which, in a transition region, narrows in the manner of a funnel and in this way forms a stop face 18 for the threaded sleeve 16. Central and tilt-free seating of the threaded sleeve 16 together with the support bar 8 which is mounted therein is therefore ensured in the stop position.

At the end which is aligned toward the outer side of the housing 4 or toward the connecting head 14, the external cross section of the threaded sleeve 16 is reduced in relation to the free cross section of the recess 10, so that, between the respective boundary faces, an intermediate space is formed which serves to hold a screw-in connecting piece 20. In order to lock the threaded sleeve 16 in its reference position, the screw-in connecting piece 20, which is provided with an external thread, is screwed so far into the recess 10 that it comes into contact with an encircling shoulder 22 of the threaded sleeve 16 and exerts a contact pressure on said shoulder 22.

For a disassembly and re-assembly of the probe 2 which is calibrated with respect to the shaft 6, without thereby influencing or changing the calibration, the screw-in connecting piece 20 is loosened and screwed out of the recess 10 of the housing wall; so that the support bar 8, which is connected to the threaded sleeve 16, together with the probe 2 can be pulled out of the recess 10.

In order to avoid that the oil pressure prevailing in the interior of the housing 4 leads to leakages, a sealing ring 24 is positioned in an encircling cutout of the threaded sleeve 16 between the threaded sleeve 16 and the funnel-shaped stop face 18 of the recess 10. Here, the cutout for the sealing ring 24 on the threaded sleeve 16 covers only a part of the contact face of the latter, so that the precise abutment of the rest of the contact face against the associated stop face 18 of the recess 10 is maintained.

Provided as an anti-twist device for the support bar 8 is a counternut 28 which, for the purpose of better accessibility, is spaced apart from the threaded sleeve 16 by a spacer sleeve 26, and which is screwed onto the support bar 8. The spacer sleeve 26 has the same outer diameter as the threaded sleeve 16 and, in the mounted and fixed state of the probe holder system 1, is at least partially encased by the screw-in connecting piece 20. In order to seal the arrangement, a sealing ring 30 which bears against the threaded sleeve 16 and against the support bar 8 is positioned at the end side in an encircling cutout of the spacer sleeve 26.

For an adjustment or calibration of the probe 2 with regard to its spacing to the shaft 6, the support bar 8 is screwed into the threaded sleeve 16, with the counternut 28 loosened, until the nominal distance between the probe head 12 and the shaft 6 is set. Said position is subsequently fixed by tightening the counternut 28 with respect to the spacer sleeve 26 which rests on the threaded sleeve 16.

The invention claimed is:

1. A probe holder system for fastening a probe to a housing wall, comprising:
   a threaded sleeve having an internal thread arranged in a reference position in a recess of the housing wall;
   a support bar for the probe having mating threads for the internal thread of the threaded sleeve and screwed into the threaded sleeve;
   a detachable counternut having an internal thread for screwing the counternut onto the support bar, the counternut arranged adjacent to the support bar;

a spacer sleeve moveable on the support bar arranged between the counternut and the threaded sleeve, wherein the counternut applies a clamping pressure through the spacer sleeve to fix and resist twisting of the holder system; and a screw-in connecting piece that screws into the recess as a fixing element, wherein a rotation of the support bar relative to the threaded sleeve to effect a rotational adjustment of the probe holder system is performed when the probe holder system is mounted on the housing wall and the fixing element is locked.

2. The probe holder system as claimed in claim 1, wherein a stop face for the threaded sleeve is provided in the recess of the housing wall.

3. The probe holder system as claimed in claim 2, wherein the stop face is formed by a funnel-shaped narrowing section of the recess.

4. The probe holder system as claimed in claim 3, wherein the threaded sleeve has an outer contour matched to the shape of the recess.

5. The probe holder system as claimed in claim 4, wherein an encircling cutout for holding a sealing ring is provided in the stop face of the housing wall or in an end side of the threaded sleeve adjacent the stop face.

6. The probe holder system as claimed in claim 5, wherein a sealing ring is positioned in the cutout.

7. The probe holder system as claimed in claim 1, wherein an edge of the spacer sleeve oriented toward the support bar and the threaded sleeve has an encircling cutout for holding a sealing ring.

8. The probe holder system as claimed in claim 7, wherein a sealing ring is positioned in the cutout.

9. The probe holder system as claimed in claim 8, wherein the spacer sleeve engages into an intermediate space delimited by the support bar and the inner side of the screw-in connecting piece.

10. The probe holder system as claimed in claim 1, wherein when the counternut and the screw-in connecting piece are tightened, that part of the spacer sleeve which projects beyond the head of the screw-in connecting piece is at least as long as the shank of the screw-in connecting piece which is sunk into the housing wall.

11. The probe holder system as claimed in claim 10, further comprising a probe for shaft monitoring, arranged on that end of the support bar aligned toward the housing interior.

12. A method for adjusting a probe fastened to a probe holder system, comprising:

arranging an internally threaded sleeve into a reference position in a recess of a housing wall;

screwing a support bar into the threaded sleeves;

locking the reference position of the threaded sleeve via a fixing element, providing a detachable anti-twist device for the support bar where the anti-twist device includes a counternut;

arranging a movable spacer sleeve between the counternut and the threaded sleeve; and rotating the support bar relative to the threaded sleeve to effectuate adjustment of the probe holder system, wherein the rotation of the support bar is carried out when the probe holder system in mounted on the housing wall and the fixing element is locked.

* * * * *